US008315273B2

(12) United States Patent
Damnjanovic et al.

(10) Patent No.: US 8,315,273 B2
(45) Date of Patent: Nov. 20, 2012

(54) BANDWIDTH SEGMENTATION AND MULTI-SEGMENT OPERATION AND CONTROL

(75) Inventors: Jelena M. Damnjanovic, Del Mar, CA (US); Juan Montojo, San Diego, CA (US); Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 416 days.

(21) Appl. No.: 12/636,589

(22) Filed: Dec. 11, 2009

(65) Prior Publication Data

US 2010/0260081 A1    Oct. 14, 2010

Related U.S. Application Data

(60) Provisional application No. 61/168,354, filed on Apr. 10, 2009.

(51) Int. Cl.
*H04J 3/16* (2006.01)
*H04W 72/00* (2009.01)

(52) U.S. Cl. ........................................ 370/465; 455/450

(58) Field of Classification Search ........................ None
See application file for complete search history.

(56) References Cited

U.S. PATENT DOCUMENTS

| 6,574,237 | B1* | 6/2003 | Bullman et al. ............... 370/465 |
| 2006/0146861 | A1* | 7/2006 | Maeda ........................... 370/448 |
| 2009/0011767 | A1 | 1/2009 | Malladi et al. |
| 2009/0046582 | A1 | 2/2009 | Sarkar et al. |
| 2009/0046656 | A1 | 2/2009 | Kitazoe et al. |
| 2009/0067386 | A1 | 3/2009 | Kitazoe |
| 2010/0054161 | A1* | 3/2010 | Montojo et al. ............... 370/280 |
| 2010/0069073 | A1* | 3/2010 | Chen et al. ..................... 455/437 |

OTHER PUBLICATIONS

3GPP: 3rd Generation Partnership Project "Technical Specification Group Radio Access Network; Requirements for further advancements for Evolved Universal Terrestrial Radio Access (E-UTRA)." 3GPP TR 36.913 V8.0.1 (Mar. 2009).
Zyren, Jim. "Overview of the 3GPP Long Term Evolution Physical Layer." White Paper 27 pages.
Green: "An Introduction to Orthogonal Frequency Division Multiplex Technology" Mar. 26, 2008, pp. 1-66, XP002606872.
Huawei: "Physical layer technologies for LTE-Advanced" 3GPP Draft; R1-081838, 3rd Generation Partnership Project (3GPP), 3GPP TSG RAN WG1 #53 Mobile Competence Centre; 650, Route Des Lucioles; F06921 Sophia-Antipolis Cedex, France; Kansas City, MO, May 5-9, 2008. (8 pages).
International Search Report and Written Opinion—PCT/US2010/030626, International Searching Authority—European Patent Office, Nov. 8, 2010.

* cited by examiner

*Primary Examiner* — Clemence Han
(74) *Attorney, Agent, or Firm* — Qualcomm Patent Group; Paul Kuo

(57) ABSTRACT

Bandwidth segmentation according to a one carrier approach conveyed in a main information block (MIB) supports a plurality of contiguous frequency segments with one frequency segment seen by legacy terminals and the whole bandwidth seen by advanced terminals. Control regions either within data regions of a legacy frequency band segment or with one or two contiguous advanced frequency band segments separated by the legacy frequency band segment are communicated to advanced terminals in system information blocks (SIBs) or conveyed to an advanced UE by dedicated signaling.

66 Claims, 12 Drawing Sheets

BANDWIDTH SEGMENTATION AND MULTI-SEGMENT OPERATION AND CONTROL

CLAIM OF PRIORITY UNDER 35 U.S.C. §119

The present application for patent claims priority to Provisional Application No. 61/168,354 entitled "MULTIPLE-CARRIER DESIGN FOR LONG TERM EVOLUTION ADVANCED MULTIPLE SEGMENT CONTROL" filed Apr. 10, 2009, and assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for one carrier operation in a highly scheduled wireless communication system with contiguous frequency bands seen by some terminals and only partially seen by legacy terminals.

BACKGROUND

The 3rd Generation Partnership Project (3GPP) Long Term Evolution (LTE) represents a major advance in cellular technology and is the next step forward in cellular 3G services as a natural evolution of the Global System for Mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as providing peak data rates up to 1 Gbit/s. Besides the peak data rate, LTE Advanced also targets faster switching between power states and improved performance at the cell edge.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for performing bandwidth segmentation in a wireless communication system by employing a processor executing computer executable instructions stored on a computer readable storage medium to implement the following acts: A downlink is received comprising a legacy frequency band segment on a single carrier. A contiguous advanced frequency band is received on the downlink carried by the single carrier. A legacy control region is received on the legacy frequency band segment.

In another aspect, a computer program product is provided for performing bandwidth segmentation in a wireless communication system. At least one computer readable storage medium stores computer executable instructions that, when executed by the at least one processor, implement components: A first set of instructions causes a computer to receive a downlink comprising a legacy frequency band segment on a single carrier. A second set of instructions causes the computer to receive a contiguous advanced frequency band on the downlink carried by the single carrier. A third set of instructions causes the computer to receive a legacy control region on the legacy frequency band segment.

In an additional aspect, an apparatus is provided for performing bandwidth segmentation in a wireless communication system. At least one computer readable storage medium stores computer executable instructions that, when executed by the at least one processor, implement components: Means are provided for receiving a downlink comprising a legacy frequency band segment on a single carrier. Means are provided for receiving a contiguous advanced frequency band on the downlink carried by the single carrier. Means are provided for receiving a legacy control region on the legacy frequency band segment.

In a further aspect, an apparatus is provided for performing bandwidth segmentation in a wireless communication system. A receiver receives a downlink by receiving a downlink comprising a legacy frequency band segment on a single carrier, receiving a contiguous advanced frequency band on the downlink carried by the single carrier, and receiving a legacy control region on the legacy frequency band segment. A computing platform processes the legacy control region. A transmitter transmits on an uplink.

In yet one aspect, a method is provided for performing bandwidth segmentation in a wireless communication system by employing a processor executing computer executable instructions stored on a computer readable storage medium to implement following acts: A downlink is transmitted comprising a legacy frequency band segment on a single carrier. A contiguous advanced frequency band is transmitted on the downlink carried by the single carrier. A control region on the downlink is transmitted that assigns a grant on a data region of the downlink.

In yet another aspect, a computer program product is provided for performing bandwidth segmentation in a wireless communication system. At least one computer readable storage medium stores computer executable instructions that, when executed by at least one processor, implement components: A first set of instructions causes a computer to transmit a downlink comprising a legacy frequency band segment on a single carrier. A second set of instructions causes the computer to transmit a contiguous advanced frequency band on the downlink carried by the single carrier. A third set of instructions causes the computer to transmit a control region on the downlink that assigns a grant on a data region of the downlink.

In yet an additional aspect, an apparatus is provided for performing bandwidth segmentation in a wireless communication system. At least one computer readable storage medium stores computer executable instructions that, when executed by the at least one processor, implement components: Means are provided for transmitting a downlink comprising a legacy frequency band segment on a single carrier. Means are provided for transmitting a contiguous advanced frequency band on the downlink carried by the single carrier. Means are provided for transmitting a control region on the downlink that assigns a grant on a data region of the downlink.

In yet a further aspect, an apparatus is provided for performing bandwidth segmentation in a wireless communication system. A scheduler assigns resources on an uplink and a downlink. A receiver receives the uplink. A transmitter transmits the downlink comprising a legacy frequency band segment on a single carrier, transmitting a contiguous advanced frequency band on the downlink carried by the single carrier, and transmitting a control region on the downlink that assigns a grant on a data region of the downlink.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Multi-segment operation using one carrier advantageously enhances 3rd Generation Partnership Project (3GPP) Long Term Evolution (LTE) Advanced. Support is provided for assigning resources to legacy LTE devices that utilize bandwidth of up to 20 MHz on a single carrier as well as advanced devices that can utilize a larger band (e.g., 20-100 MHz). Backward compatibility is advantageously maintained for downlink (DL) and uplink (UL) control and data structure of a multi-segment 3GPP Long Term Evolution-Advanced (LTE-A) system.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
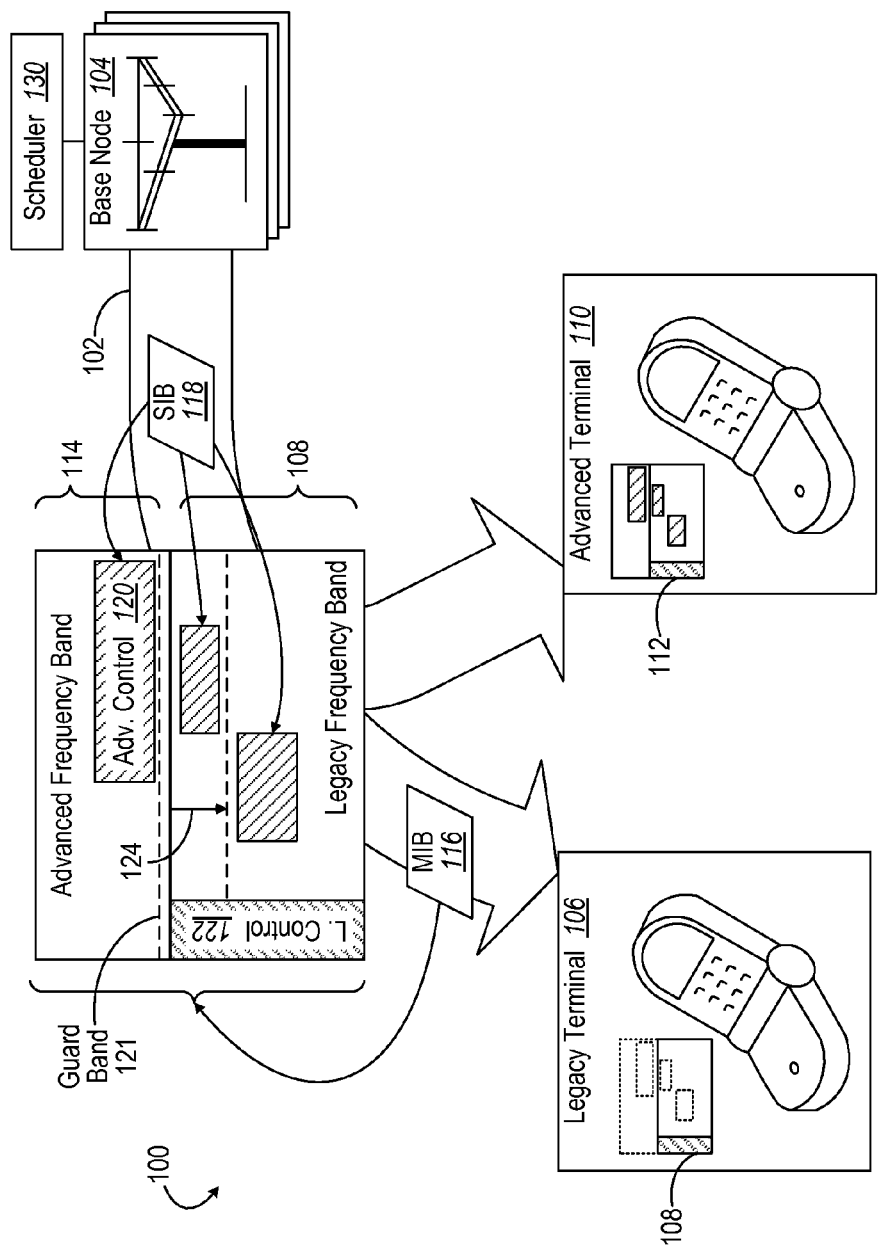
FIG. 1 illustrates a block diagram of a wireless communication network performing control for bandwidth segmentation with one carrier operation for legacy and advanced terminals in a scheduled wireless communication system.

In FIG. 1, a scheduled communication system 100 provides for uplink (UL) and downlink (DL) control 102 by a base node, such as an evolved Base Node (eNB) 104, to a legacy terminal or User Equipment (UE) 106 that receives only a legacy frequency band 108 and to an advanced terminal or UE 110 that receives a whole band 112 that includes an advanced frequency band 114 and the legacy frequency band 108. In a main information block (MIB) 116, the eNB 104 defines the legacy frequency band 108. A system information block (SIB) 118 informs the advanced terminal or UE 110 about the existence and where and how big the advanced control regions 120 are and can be received, including defining guard bands 121 between bands. The existence, position and size of the segments can be advanced UE specific, in which case the information about segment(s) is conveyed to an advanced UE by dedicated signaling. The eNB 104 does not schedule the legacy terminal or UE 106 to receive or transmit on the advanced control regions 120. In addition, these advanced control regions can be in legacy frequency band 108 or advanced frequency band 114. A legacy terminal or UE 106 is provisioned to know that a legacy control region 122 is in a first time slot in the legacy frequency band 108.

Advantageously, the eNB 104 can reduce a legacy bandwidth allocation as depicted at 124 if it is determined that a more efficient allocation should be made for advanced terminals or UEs 110 or for the purpose of battery savings by reducing power consumption for the legacy terminals if the legacy terminals have low bandwidth (data rate) needs, as is the case with VoIP traffic. Bandwidth is thus allocated to be sufficient in an adaptive or semi-static manner.

A scheduler 130 can perform allocation of resources across a plurality of eNBs 104 such as for space-time coding or for reuse of resources with adaptive power control.

Figure 2:
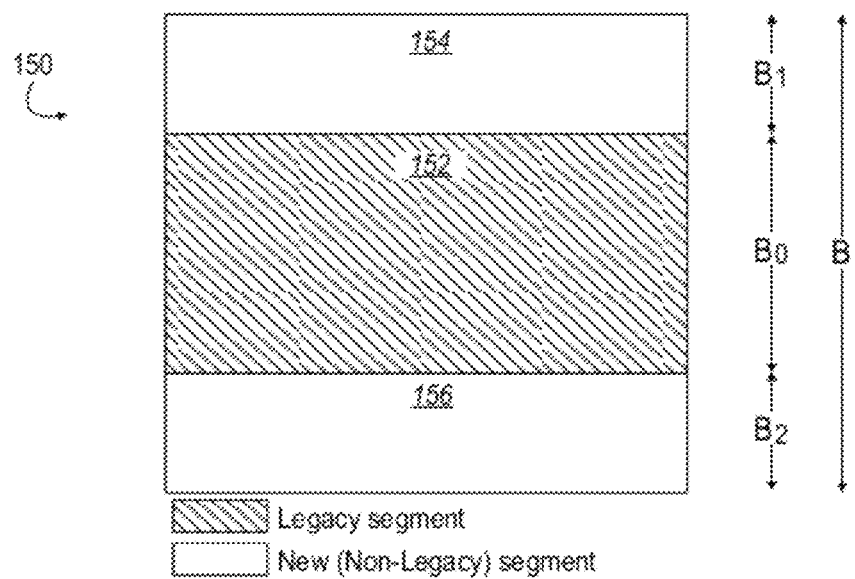
FIG. 2 illustrates a block diagram of a segmented band.

In FIG. 2, a single carrier, multiple segment bandwidth "B" 150 comprises a legacy frequency bandwidth "$B_0$" 152 that is contiguous to an advanced frequency bandwidth, which comprises an upper bandwidth "$B_1$" 154 and a lower bandwidth "$B_2$" 156.

Figure 3:
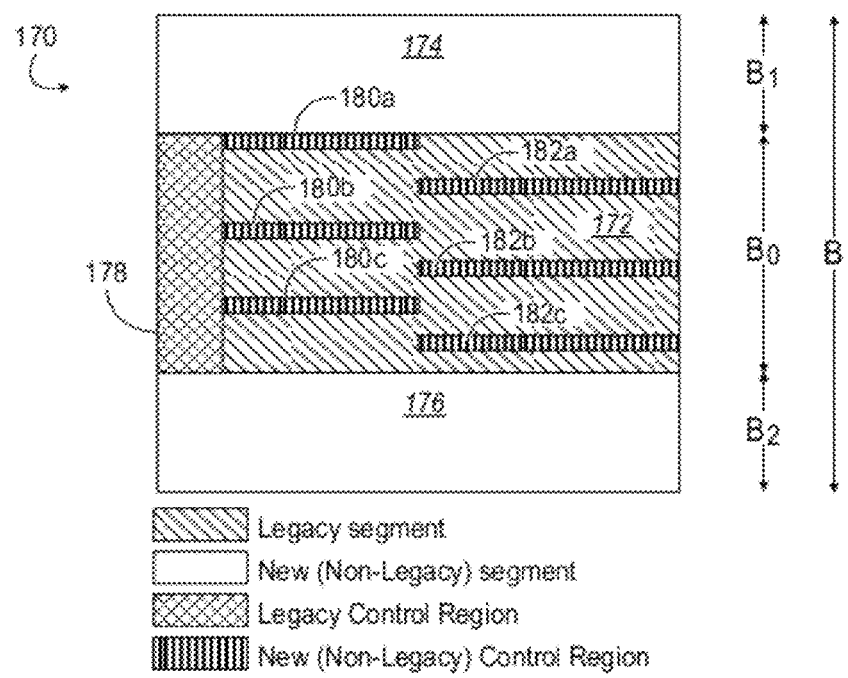
FIG. 3 illustrates a block diagram of a downlink control wherein advanced control regions with frequency hopping are placed within legacy data regions.

In FIG. 3, a single carrier, multiple segment bandwidth "B" 170 that can perform PDCCH comprises a legacy frequency bandwidth "$B_0$" 172 that is contiguous to an advanced frequency bandwidth, which comprises an upper bandwidth "$B_1$" 174 and a lower bandwidth "$B_2$" 176. A legacy control region 178 resides within a first time slot across the full legacy frequency band "$B_0$" 172. The illustrative advanced control regions are depicted as three FDD segments 180a-180c in a time slot following the legacy control region 178 that frequency hop respectively to FDD segments 182a-182c in a subsequent time slot.

Figure 4:
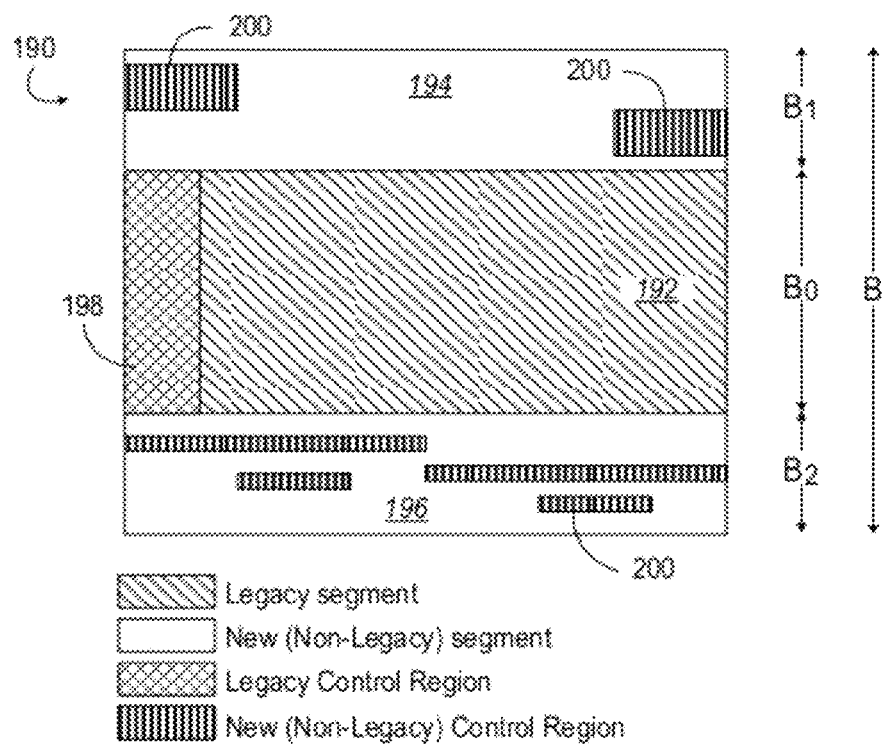
FIG. 4 illustrates a block diagram of a downlink control wherein advanced control regions are placed within advanced frequency bands contiguous to a legacy frequency band.

In FIG. 4, a single carrier, multiple segment bandwidth "B" 190 that can perform PDCCH comprises a legacy frequency bandwidth "$B_0$" 192 that is contiguous to an advanced frequency bandwidth, which comprises an upper bandwidth "$B_1$" 194 and a lower bandwidth "$B_2$" 196. A legacy control region 198 resides within a first time slot across the full legacy frequency band "$B_0$" 192. The illustrative advanced control regions are depicted as time and frequency duplexed segments 200 that are placed in both upper and lower advanced frequency bandwidths 194 and 196, respectively.

Figure 5:
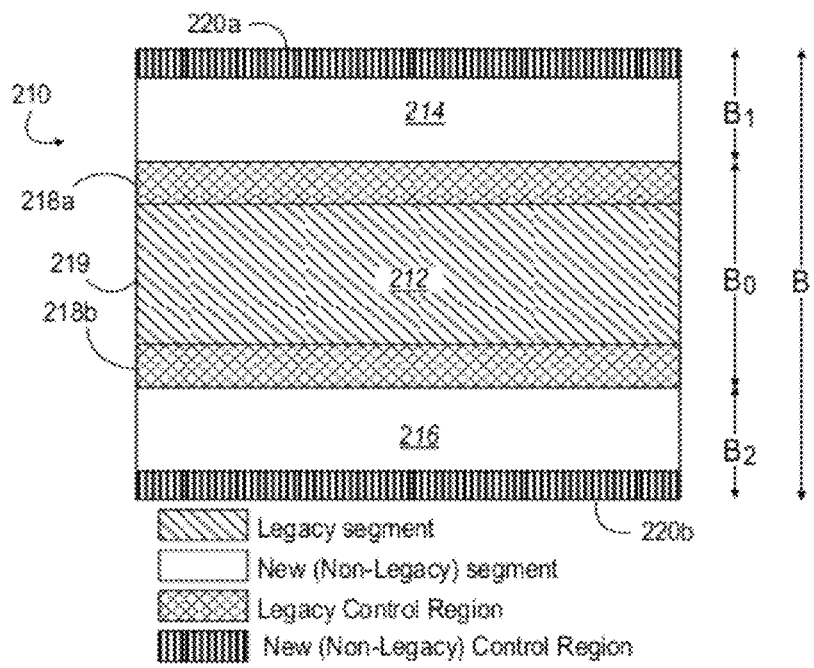
FIG. 5 illustrates a block diagram of an uplink control wherein advanced control regions are placed within advanced frequency bands contiguous to a legacy frequency band.

In FIG. 5, a single carrier, multiple segment bandwidth "B" 210 that can perform PUCCH comprises a legacy frequency bandwidth "$B_0$" 212 that is contiguous to an advanced frequency bandwidth, which comprises an upper bandwidth "$B_1$" 214 and a lower bandwidth "$B_2$" 216. Legacy upper and lower control regions 218a, 218b are FDD separated from a legacy data region 219 in the legacy frequency band "$B_0$" 212. The illustrative advanced control regions are depicted as an upper frequency duplexed segment 220a in the upper bandwidth 214 and a lower frequency duplexed segment 220b in the lower bandwidth 216.

Figure 6:
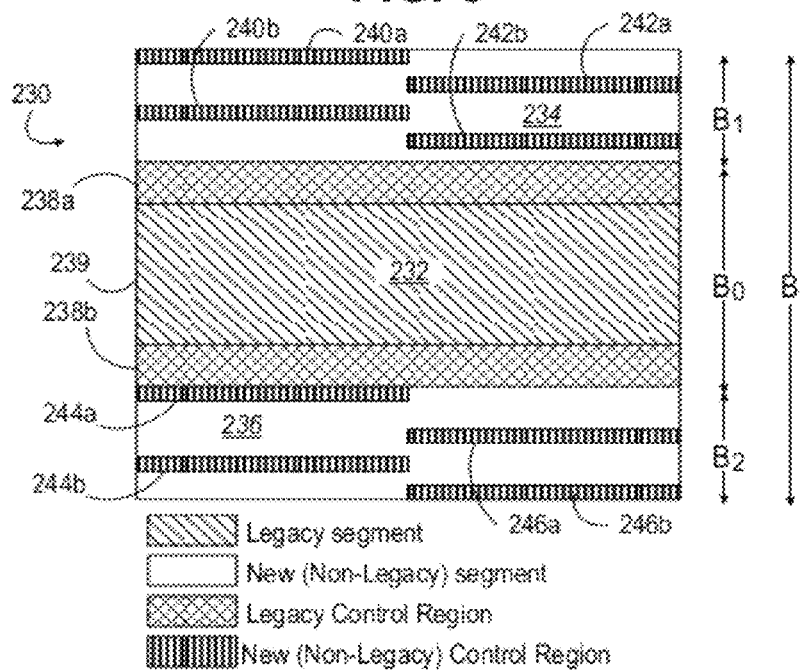
FIG. 6 illustrates a block diagram of an uplink control wherein advanced control regions are placed within advanced frequency bands contiguous to a legacy frequency band with frequency hopping.

In FIG. 6, a single carrier, multiple segment bandwidth "B" 230 that can perform PUCCH comprises a legacy frequency bandwidth "$B_0$" 232 that is contiguous to an advanced frequency bandwidth, which comprises an upper bandwidth "$B_1$" 234 and a lower bandwidth "$B_2$" 236. Legacy upper and lower control regions 238a, 238b are FDD separated from a legacy data region 239 in the legacy frequency band "$B_0$" 232. The illustrative advanced control regions are depicted as upper frequency duplexed segments 240a, 240b in a first time slot in the upper bandwidth 234 that frequency hops respectively in a second time slot as depicted at 242a, 242b. The illustrative advanced control regions are further depicted as lower frequency duplexed segment 244a, 244b in a first time slot in the lower bandwidth 236 that frequency hop respectively in a second time slot as depicted at 246a, 246b.

It should be appreciated with the benefit of the present disclosure that a downlink can comprise a legacy frequency band on a single carrier that may or may not contain a legacy control region and may or may not contain at least one legacy data region. This omission may be temporary. Similarly, the downlink may or may not contain a contiguous advanced frequency band on the downlink carried by the single carrier comprising an advanced data region. Again, the omission may be temporary. For example, an advanced control region on the downlink can be exclusive of the legacy control region that is not currently being transmitted or use different region resources as previously depicted. For example, it may be the case that there are multiple bandwidth segments configured within one carrier, but no non-legacy (advanced) control regions may be present other than legacy PDCCH control regions. The non-legacy control region and bandwidth segments may be defined and configured independently or together.

Figure 7:
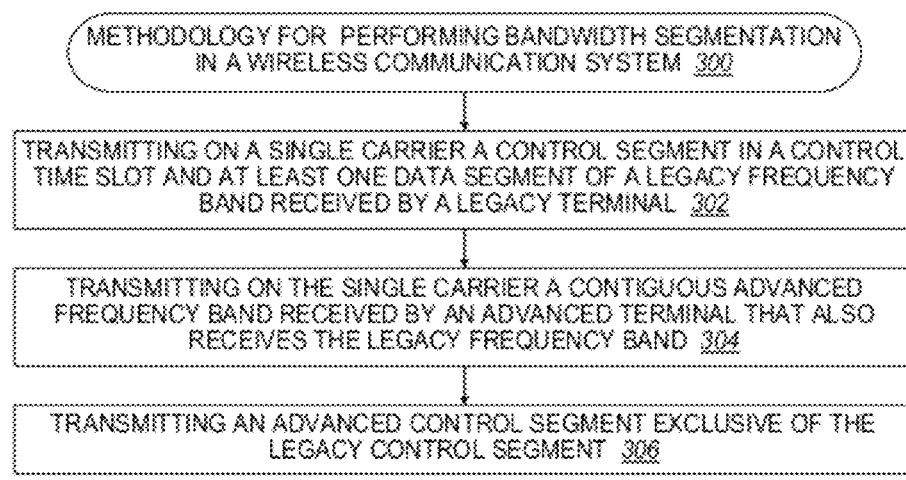
FIG. 7 illustrates a flow diagram of a methodology or sequence of operations for performing control for bandwidth segmentation with one carrier operation for legacy and advanced terminals in a scheduled wireless communication system.

In FIG. 7, a methodology or sequence of operations 300 is provided for performing bandwidth segmentation in a wireless communication system. In block 302, a legacy control region and at least one legacy data region of a legacy frequency band are transmitted on a single carrier and received by a legacy terminal. In block 304, a contiguous advanced frequency band is transmitted on the single carrier received by an advanced terminal that also receives the legacy frequency band. In block 306, an advanced control region exclusive of the legacy control region is transmitted on the single carrier. In an exemplary aspect, the advanced control region may be omitted. For example, a population of legacy devices may be served that are incapable of utilizing the contiguous advanced frequency band segment.

In one aspect, the methodology 300 further comprises transmitting in a main information block (MIB) a definition for the legacy frequency band as comprising up to 20 MHz.

In another aspect, the methodology 300 further comprises determining a served population of legacy and advanced terminals; and transmitting in a main information block (MIB) a definition for the legacy frequency band as comprising less than equal 20 MHz in response to determining that a data requirement of the served population of legacy terminals is smaller than the served population of advanced terminals.

In an additional aspect, the methodology 300 further comprises transmitting the advanced control region within a data time slot of the legacy frequency band.

In another additional aspect, the methodology 300 further comprises frequency hopping the advanced control region across two data time slots of the legacy frequency band.

In a further aspect, the methodology 300 further comprises transmitting the advanced control region within the advanced frequency band.

In a yet one aspect, the methodology 300 further comprises transmitting the single carrier by transmitting a physical downlink control channel (PDCCH) wherein the legacy control region comprises a time slot within the legacy frequency band.

In yet another aspect, a methodology 300 further comprises transmitting the single carrier by transmitting a physical uplink control channel (PUCCH) wherein the legacy control region is frequency division duplex (FDD) separated from data regions.

In yet an additional aspect, the methodology 300 further comprises a second advanced frequency band contiguous to and separated from the first advanced frequency band by the legacy frequency band.

In yet another additional aspect, the methodology 300 further comprises transmitting a 10 MHz first advanced frequency band and a 10 MHz second advanced frequency band separated by a 20 MHz legacy frequency band. It should be appreciated that the aforementioned values and ranges are illustrative.

In yet a further aspect, the methodology 300 further comprises broadcasting information regarding the advanced control region in a system information broadcast. A UE can then receive the broadcast information.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 8:
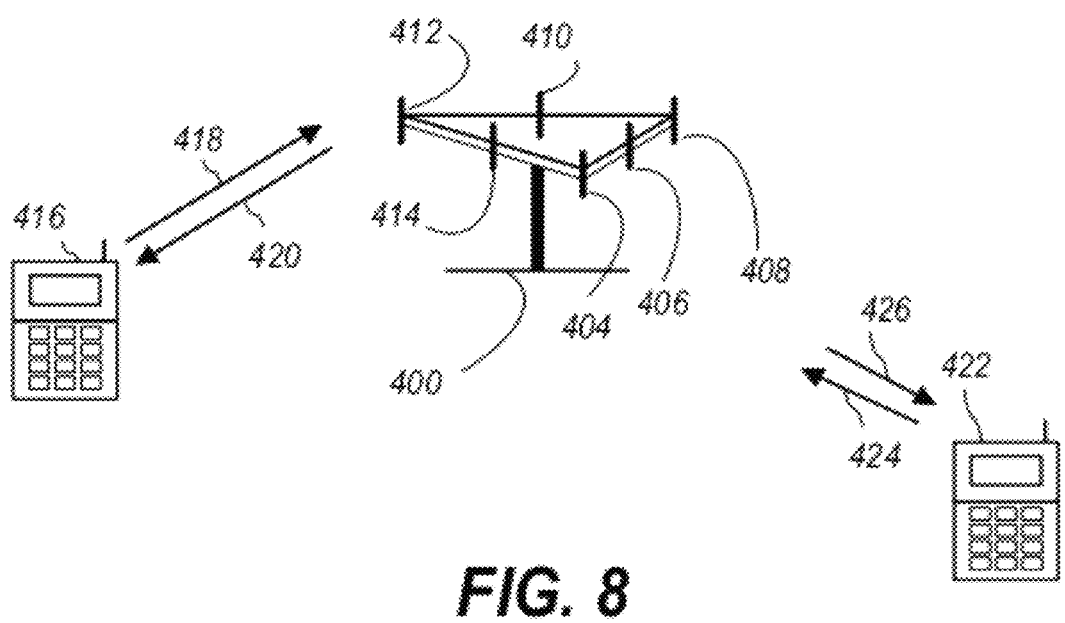
FIG. 8 illustrates a diagram of a multiple access wireless communication system according to one aspect for performing neighborhood utility function for resource partitioning updates.

Referring to FIG. 8, a multiple access wireless communication system according to one aspect is illustrated. An access point (AP) 400 includes multiple antenna groups, one including 404 and 406, another including 408 and 410, and an additional including 412 and 414. In FIG. 8, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequencies for communication. For example, forward link 420 may use a different frequency then that used by reverse link 418.

Each group of antennas and/or the area in which they are designed to communicate is often referred to as a sector of the access point 400. In the aspect, antenna groups each are designed to communicate to access terminals 416 and 422 in a sector of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all of its access terminals.

An access point 400 may be a fixed station used for communicating with the terminals and may also be referred to as an access point, a Node B, or some other terminology. The access terminals 416 and 422 may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 9:
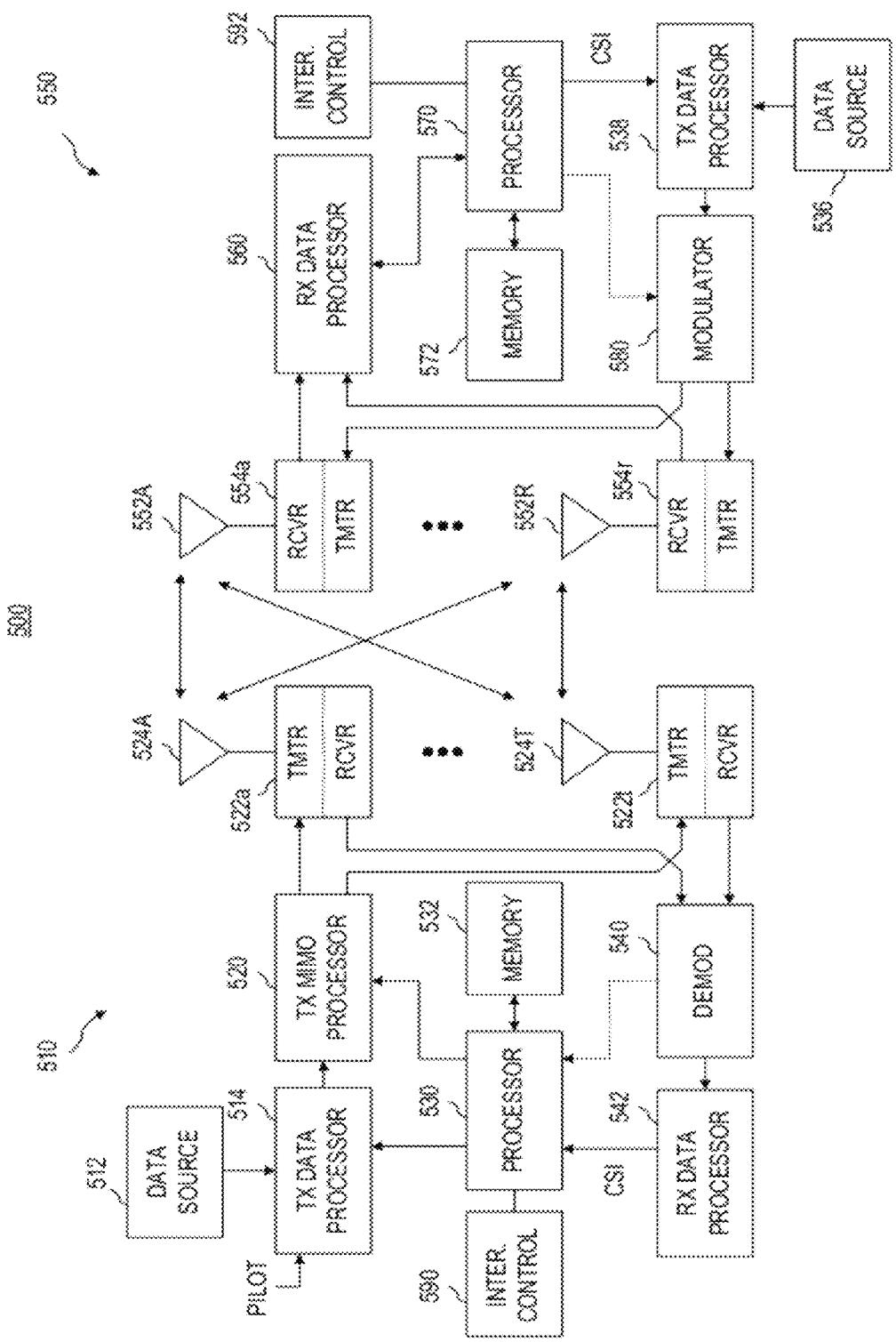
FIG. 9 illustrates a schematic block diagram of a communication system for performing neighborhood utility function for resource partitioning updates.

The teachings herein may be incorporated into a node (e.g., a device) employing various components for communicating with at least one other node. FIG. 9 depicts several sample components that may be employed to facilitate communication between nodes. Specifically, FIG. 9 illustrates a wireless device 510 (e.g., an access point) and a wireless device 550 (e.g., an access terminal) of a MIMO system 500. At the device 510, traffic data for a number of data streams is provided from a data source 512 to a transmit ("TX") data processor 514.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A data memory 532 may store program code, data, and other information used by the processor 530 or other components of the device 510.

The modulation symbols for all data streams are then provided to a TX MIMO processor 520, which may further process the modulation symbols (e.g., for OFDM). The TX MIMO processor 520 then provides $N_T$ modulation symbol streams to $N_T$ transceivers ("XCVR") 522a through 522t that each has a transmitter (TMTR) and receiver (RCVR). In some aspects, the TX MIMO processor 520 applies beam-forming weights to the symbols of the data streams and to the antenna from which the symbol is being transmitted.

Each transceiver 522a-522t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 522a through 522t are then transmitted from $N_T$ antennas 524a through 524t, respectively.

At the device 550, the transmitted modulated signals are received by $N_R$ antennas 552a through 552r and the received signal from each antenna 552a-552r is provided to a respective transceiver ("XCVR") 554a through 554r. Each transceiver 554a-554r conditions (e.g., filters, amplifies, and downconverts) a respective received signal, digitizes the conditioned signal to provide samples, and further processes the samples to provide a corresponding "received" symbol stream.

A receive ("RX") data processor 560 then receives and processes the $N_R$ received symbol streams from $N_R$ transceivers 554a-554r based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the device 510.

A processor 570 periodically determines which pre-coding matrix to use. The processor 570 formulates a reverse link message comprising a matrix index portion and a rank value portion. A data memory 572 may store program code, data, and other information used by the processor 570 or other components of the device 550.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554a through 554r, and transmitted back to the device 510.

At the device 510, the modulated signals from the device 550 are received by the antennas 524a-524t, conditioned by the transceivers 522a-522t, demodulated by a demodulator ("DEMOD") 540, and processed by a RX data processor 542 to extract the reverse link message transmitted by the device 550. The processor 530 then determines which pre-coding matrix to use for determining the beam-forming weights then processes the extracted message.

FIG. 9 also illustrates that the communication components may include one or more components that perform interference control operations. For example, an interference ("INTER.") control component 590 may cooperate with the processor 530 and/or other components of the device 510 to send/receive signals to/from another device (e.g., device 550). Similarly, an interference control component 592 may cooperate with the processor 570 and/or other components of the device 550 to send/receive signals to/from another device (e.g., device 510). It should be appreciated that for each device 510 and 550 the functionality of two or more of the described components may be provided by a single component. For example, a single processing component may provide the functionality of the interference control component 590 and the processor 530 and a single processing component may provide the functionality of the interference control component 592 and the processor 570.

Figure 10:
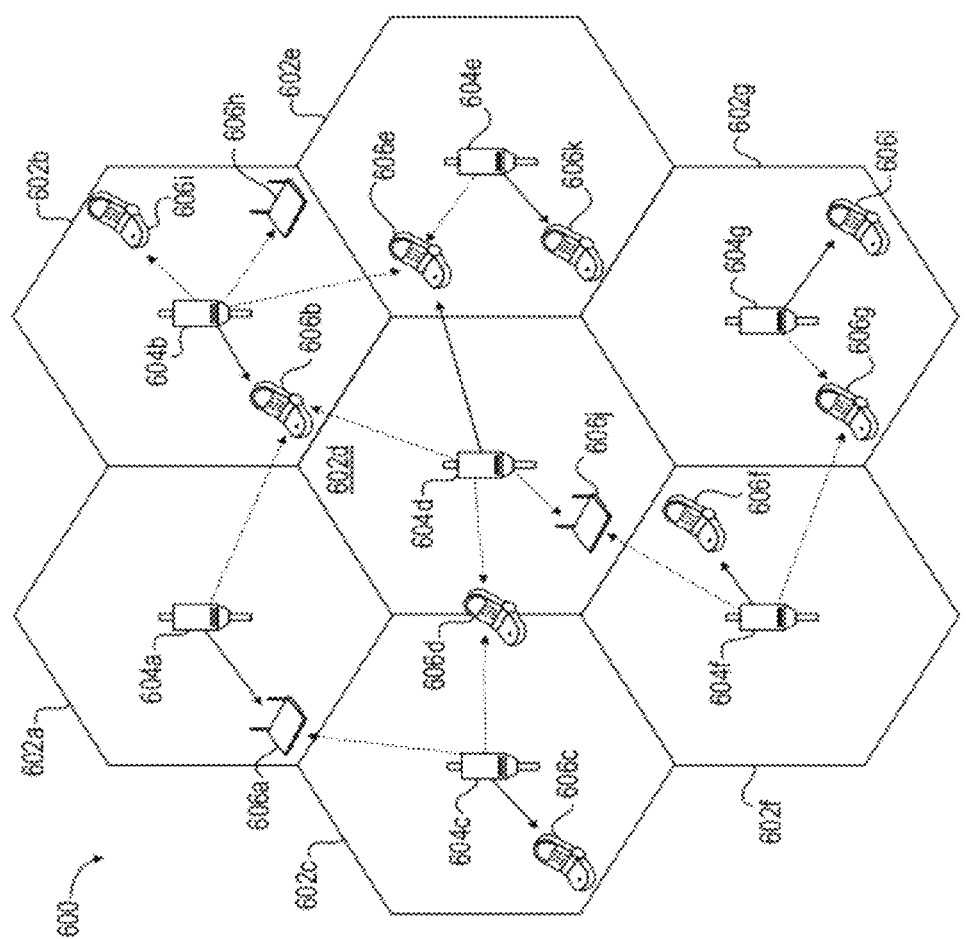
FIG. 10 illustrates an exemplary wireless communication system.

FIG. 10 illustrates a wireless communication system 600, configured to support a number of users, in which the teachings herein may be implemented. The system 600 provides communication for multiple cells 602, such as, for example, macro cells 602a-602g, with each cell being serviced by a corresponding access node 604 (e.g., access nodes 604a-604g). As shown in FIG. 10, access terminals 606 (e.g., access terminals 606a-606l) may be dispersed at various locations throughout the system over time. Each access terminal 606 may communicate with one or more access nodes 604 on a forward link ("FL") and/or a reverse link ("RL) at a given moment, depending upon whether the access terminal 606 is active and whether it is in soft handoff, for example. The wireless communication system 600 may provide service over a large geographic region. For example, macro cells 602a-602g may cover a few blocks in a neighborhood.

Figure 11:
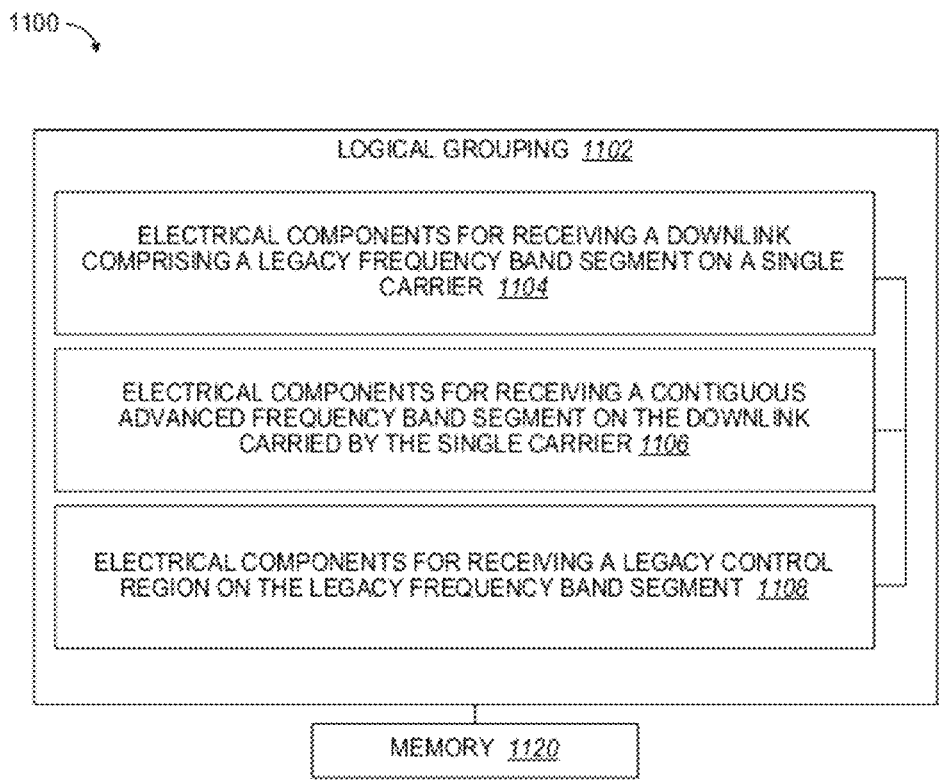
FIG. 11 illustrates a system such as user equipment having logical groupings of electrical components for receiving bandwidth segmentation.

With reference to FIG. 11, illustrated is a system 1100 for performing bandwidth segmentation in a wireless communication system. For example, system 1100 can reside at least partially within user equipment (UE). It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for receiving a downlink comprising a legacy frequency band segment on a single carrier 1104. Moreover, logical grouping 1102 can include an electrical component for receiving a contiguous advanced frequency band segment on the downlink carried by the single carrier 1106. Further, logical grouping 1102 can include an electrical component for receiving a legacy control region on the legacy frequency band segment 1108. Additionally, system 1100 can include a memory 1120 that retains instructions for executing functions associated with electrical components 1104-1108. While shown as being external to memory 1120, it is to be understood that one or more of electrical components 1104-1108 can exist within memory 1120.

Figure 12:
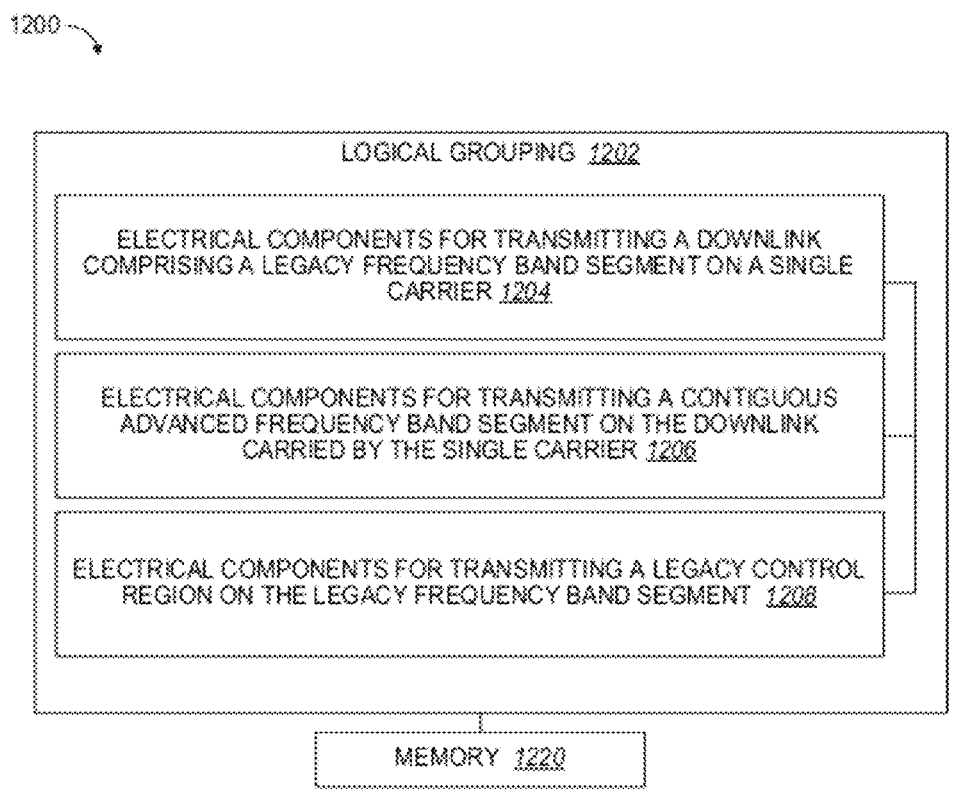
FIG. 12 illustrates a system such as a base node having logical groupings of electrical components for transmitting bandwidth segmentation.

With reference to FIG. 12, illustrated is a system 1200 for performing bandwidth segmentation in a wireless communication system. For example, system 1200 can reside at least partially within network entity for providing radio access (e.g., eNB). It is to be appreciated that system 1200 is represented as including functional blocks, which can be functional blocks that represent functions implemented by a computing platform, processor, software, or combination thereof (e.g., firmware). System 1200 includes a logical grouping 1202 of electrical components that can act in conjunction. For instance, logical grouping 1202 can include an electrical component for transmitting a downlink comprising a legacy frequency band segment on a single carrier 1204. Moreover, logical grouping 1202 can include an electrical component for transmitting a contiguous advanced frequency band segment on the downlink carried by the single carrier 1206. Further, logical grouping 1202 can include an electrical component for transmitting a legacy control region on the legacy frequency band segment 1208. Additionally, system 1200 can include a memory 1220 that retains instructions for executing functions associated with electrical components 1204-1208. While shown as being external to memory 1220, it is to be understood that one or more of electrical components 1204-1208 can exist within memory 1220.

Figure 13:
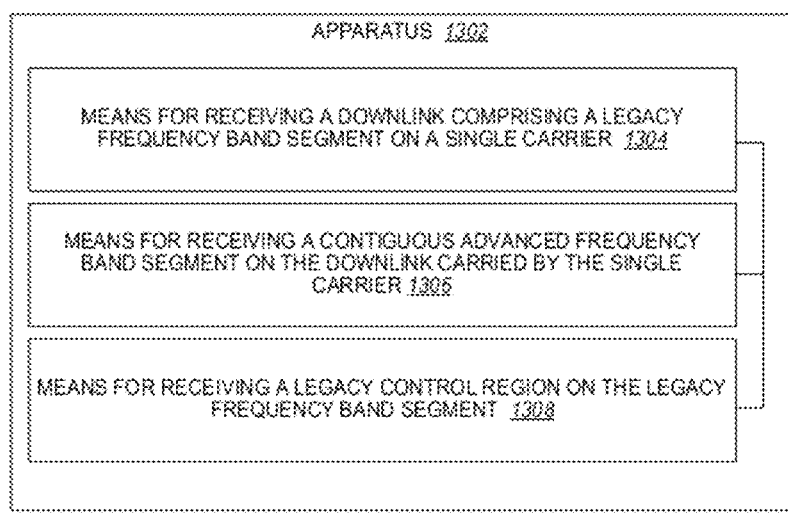
FIG. 13 illustrates an apparatus such as user equipment having means for receiving bandwidth segmentation.

In FIG. 13, an apparatus 1302 is depicted for performing bandwidth segmentation in a wireless communication system. Means 1304 are provided for receiving a downlink comprising a legacy frequency band segment on a single carrier. Means 1306 are provided for receiving a contiguous advanced frequency band segment on the downlink carried by the single carrier. Means 1308 are provided for receiving a legacy control region on the legacy frequency band segment.

Figure 14:
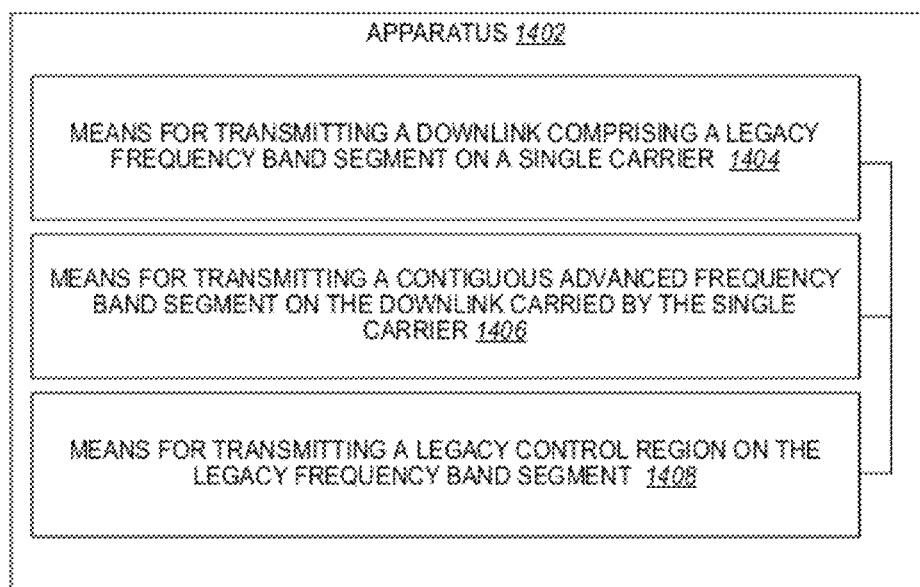
FIG. 14 illustrates an apparatus such as a base node having means for transmitting bandwidth segmentation.

In FIG. 14, an apparatus 1402 is depicted for performing bandwidth segmentation in a wireless communication system. Means 1404 are provided for transmitting a downlink comprising a legacy frequency band segment on a single carrier. Means 1406 are provided for transmitting a contiguous advanced frequency band segment on the downlink carried by the single carrier. Means 1408 are provided for transmitting a legacy control region on the legacy frequency band segment.

By benefit of the foregoing, bandwidth segmentation is provided within a single carrier approach wherein the system bandwidth is divided into several contiguous segments. The bandwidth segment seen by legacy UEs is conveyed in MIB. Legacy UEs are not aware of the other segments. By contrast, the bandwidth segments seen by new UEs (advanced terminals) are conveyed in an additional SIB or by dedicated signaling. In some instances, advanced UEs are aware of the all existing bandwidth segments. Alternatively, advanced UEs are aware of some bandwidth segments, especially if informed on an individual UE basis by dedicated signaling.

For example, if the whole system bandwidth is 40 MHz, central 20 MHz (B0) can be defined in MIB (Master Information Block). Other two segments of 10 MHz (B1 and B2) can be defined in an additional SIB (System Information Block) or conveyed to an advanced UE by dedicated signaling. Legacy UEs have a notion of 20 MHz. All control and data structure conform to the Rel-8. Advanced UEs have a notion of all 40 MHz (e.g., one segment of 20 MHz and two segments of 10 MHz each). For synchronization, legacy PSS/SSS (Primary Synchronization Signal/Secondary Synchronization Signal) structure is used. In the middle of the central, legacy band, all UEs (legacy and new ones) do the same cell search and synchronization procedure. For System Information Broadcast, all UEs acquire the basic system information on the legacy PBCH (Physical Broadcast Channel). Middle 72 tones of the legacy band in certain OFDM symbols are used during the 4 consecutive radio frames. Additional SIB conveys multi-segment information that is read by non-legacy terminals only and pertains to bandwidth and location of each non-legacy segment. With regard to downlink (DL) control, legacy control region for grants is retained. The first OFDM symbols, as defined by PCFICH (Physical Control Format Indicator Channel), are used for control of the legacy UEs and for advanced UEs. A new control region is for new grant formats to assign legacy and non-legacy segments. An extension of the existing format provides better granularity of the larger bandwidth.

The new control region is defined in response to factors such as that the legacy control region is not sufficient, addressing the existence of Femto/Pico cells, and providing for beam forming. The new control region can be located within the data channel band with exact frequency location of the control region defined in an additional SIB or by UE dedicated signaling. For example, the new control region for advanced UEs can be in any of the segments using building blocks smaller than resource block (RB) that need not span the whole slot. In addition, several configurations can support different scenarios, such as supporting micro-sleep and containing demodulation reference signal (DRS). The new control region enables diversity and protection by supporting frequency diverse allocation and hopping, frequency coordination to protect the band, and orthogonal cover for a synchronous system. New segments can be used to transmit data and control, data only or control only. Uplink (UL) control retains legacy control region on the edges of the legacy segment and is used for control of the legacy UEs and for Advanced UEs.

For clarity, various aspects described herein are performed with respect to band segmentation within one carrier. However, it should be appreciated with the benefit of the present disclosure that band segmentation can be implemented with regard to multiple carriers within a multicarrier system. For example, in a three-carrier system, a first carrier can have two non-legacy (advanced) bandwidth segments, a second carrier can have four non-legacy (advanced) bandwidth segments, and a third carrier can be without non-legacy (advanced) bandwidth segments.

Different UEs may have different knowledge about non-legacy bandwidth segments. Continuing with the previous example, a first UE may be aware of two out of four segments on the second carrier while a second UE may be aware of all four segments on the second carrier.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNodeB) can infer or predict when a robust or augmented check field has been employed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for performing bandwidth segmentation in a wireless communication system, comprising:
    employing a processor executing computer executable instructions stored on a computer readable storage medium to implement following acts:
    receiving a downlink comprising a legacy frequency band segment on a single carrier;
    receiving a contiguous advanced frequency band segment on the downlink carried by the single carrier; and
    receiving a legacy control region on the legacy frequency band segment.

2. The method of claim 1, further comprising:
    receiving a downlink comprising the legacy frequency band segment on the single carrier containing the legacy control region and at least one legacy data region;
    receiving the contiguous advanced frequency band segment on the downlink carried by the single carrier comprising an advanced data region; and
    receiving an advanced control region on the downlink that is exclusive of the legacy control region.

3. The method of claim 2, further comprising receiving the advanced control region within a data time slot of the legacy frequency band segment.

4. The method of claim 3, further comprising frequency hopping to receive the advanced control region across two data time slots of the legacy frequency band segment.

5. The method of claim 2, further comprising receiving the advanced control region within the contiguous advanced frequency band segment.

6. The method of claim 2, further comprising receiving the single carrier by receiving a physical downlink control channel (PDCCH) wherein the legacy control region comprises a time slot within the legacy frequency band segment.

7. The method of claim 2, further comprising receiving the single carrier by receiving a physical uplink control channel (PUCCH) wherein the legacy control region is frequency division duplex (FDD) separated from data regions.

8. The method of claim 2, further comprising receiving a second contiguous advanced frequency band segment separated from the contiguous advanced frequency band segment by the legacy frequency band segment, wherein the second contiguous advanced frequency band segment is contiguous with the legacy frequency band segment.

9. The method of claim 2, further comprising receiving a 10 MHz first contiguous advanced frequency band segment and a 10 MHz second contiguous advanced frequency band segment separated by a 20 MHz legacy frequency band segment.

10. The method of claim 2, further comprising receiving broadcast information regarding the advanced control region in a system information broadcast.

11. The method of claim 10, further comprising receiving the system information broadcast by dedicated signaling.

12. The method of claim 2, further comprising receiving a definition of a guard band between legacy band and contiguous advanced frequency band segment.

13. The method of claim 2, further comprising receiving an advanced control region as an extension to synchronization and system information transmitted by the legacy control region via the single carrier.

14. A computer program product for performing bandwidth segmentation in a wireless communication system, comprising:
at least one computer readable storage medium storing non-transitory computer executable instructions that, when executed by the at least one processor, implement components comprising:
a first set of instructions for causing a computer to receive a downlink comprising a legacy frequency band segment on a single carrier;
a second set of instructions for causing the computer to receive a contiguous advanced frequency band segment on the downlink carried by the single carrier; and
a third set of instructions for causing the computer to receive a legacy control region on the legacy frequency band segment.

15. An apparatus for performing bandwidth segmentation in a wireless communication system, comprising:
at least one processor;
at least one computer readable storage medium storing computer executable instructions that, when executed by the at least one processor, implement components comprising:
means for receiving a downlink comprising a legacy frequency band segment on a single carrier;
means for receiving a contiguous advanced frequency band segment on the downlink carried by the single carrier; and
means for receiving a legacy control region on the legacy frequency band segment.

16. An apparatus for performing bandwidth segmentation in a wireless communication system, comprising:
a receiver for receiving a downlink by,
receiving a downlink comprising a legacy frequency band segment on a single carrier,
receiving a contiguous advanced frequency band segment on the downlink carried by the single carrier,
receiving a legacy control region on the legacy frequency band segment;
a computing platform for processing the legacy control region; and
a transmitter for transmitting on an uplink.

17. The apparatus of claim 16, wherein the receiver is further for receiving the downlink by,
receiving a downlink comprising the legacy frequency band segment on the single carrier containing the legacy control region and at least one legacy data region;
receiving the contiguous advanced frequency band segment on the downlink carried by the single carrier comprising an advanced data region; and
receiving an advanced control region on the downlink that is exclusive of the legacy control region.

18. The apparatus of claim 17, wherein the receiver is further for receiving the advanced control region within a data time slot of the legacy frequency band segment.

19. The apparatus of claim 17, wherein the receiver is further for frequency hopping to receive the advanced control region across two data time slots of the legacy frequency band segment.

20. The apparatus of claim 17, wherein the receiver is further for receiving the advanced control region within the contiguous advanced frequency band segment.

21. The apparatus of claim 17, wherein the receiver is further for receiving the single carrier by receiving a physical downlink control channel (PDCCH) wherein the legacy control region comprises a time slot within the legacy frequency band segment.

22. The apparatus of claim 17, wherein the receiver is further for receiving the single carrier by receiving a physical uplink control channel (PUCCH) wherein the legacy control region is frequency division duplex (FDD) separated from data regions.

23. The apparatus of claim 17, wherein the receiver is further for receiving a second contiguous advanced frequency band segment separated from the contiguous advanced frequency band segment by the legacy frequency band segment, wherein the second contiguous advanced frequency band segment is contiguous with the legacy frequency band segment.

24. The apparatus of claim 17, wherein the receiver is further for receiving a 10 MHz first advanced frequency band segment and a 10 MHz second advanced frequency band segment separated by a 20 MHz legacy frequency band segment.

25. The apparatus of claim 17, wherein the receiver is further for receiving broadcast information regarding the advanced control region in a system information broadcast.

26. The apparatus of claim 25, wherein the receiver is further for receiving the system information broadcast by dedicated signaling.

27. The apparatus of claim 17, wherein the receiver is further for receiving a definition of a guard band between legacy band and contiguous advanced frequency band segment.

28. The apparatus of claim 17, wherein the receiver is further for receiving an advanced control region as an extension to synchronization and system information transmitted by the legacy control region via the single carrier.

29. A method for performing bandwidth segmentation in a wireless communication system, comprising:
employing a processor executing computer executable instructions stored on a computer readable storage medium to implement following acts:
transmitting a downlink comprising a legacy frequency band segment on a single carrier;
transmitting a contiguous advanced frequency band segment on the downlink carried by the single carrier; and
transmitting a legacy control region on the legacy frequency band segment.

30. The method of claim 29, further comprising:
transmitting a downlink comprising the legacy frequency band segment on the single carrier containing the legacy control region and at least one legacy data region;
transmitting the contiguous advanced frequency band segment on the downlink carried by the single carrier comprising an advanced data region; and
transmitting an advanced control region on the downlink that is exclusive of the legacy control region.

31. The method of claim 30, further comprising:
determining a first served population of legacy terminals and a second served population of advanced terminals; and
transmitting in a main information block (MIB) a definition for the legacy frequency band segment as comprising less than 20 MHz in response to the first served population of legacy terminals being smaller than the second served population of advanced terminals.

32. The method of claim 30, further comprising transmitting the advanced control region within a data time slot of the legacy frequency band segment.

33. The method of claim 32, further comprising frequency hopping the advanced control region across two data time slots of the legacy frequency band segment.

34. The method of claim 30, further comprising transmitting the advanced control region within the contiguous advanced frequency band segment.

35. The method of claim 30, further comprising transmitting the single carrier by transmitting a physical downlink control channel (PDCCH) wherein the legacy control region comprises a time slot within the legacy frequency band segment.

36. The method of claim 30, further comprising transmitting the single carrier by transmitting a physical uplink control channel (PUCCH) wherein the legacy control region is frequency division duplex (FDD) separated from data regions.

37. The method of claim 30, further comprising transmitting a second contiguous advanced frequency band segment separated from the contiguous advanced frequency band segment by the legacy frequency band segment, wherein the second contiguous advanced frequency band segment is contiguous with the legacy frequency band segment.

38. The method of claim 30, further comprising transmitting a 10 MHz first contiguous advanced frequency band segment and a 10 MHz second contiguous advanced frequency band segment separated by a 20 MHz legacy frequency band segment.

39. The method of claim 30, further comprising broadcasting information regarding the advanced control region in a system information broadcast.

40. The method of claim 39, further comprising conveying the system information broadcast by dedicated signaling to an advanced terminal.

41. The method of claim 30, further comprising defining a guard band between legacy band and contiguous advanced frequency band segment.

42. The method of claim 30, further comprising transmitting the advanced control region as an extension to synchronization and system information transmitted by a legacy control region on the single carrier.

43. The method of claim 30, further comprising transmitting the advanced control region for data.

44. The method of claim 30, further comprising transmitting the advanced control region for control.

45. The method of claim 44, further comprising transmitting the advanced control region for data and control.

46. The method of claim 30, further comprising:
determining a data requirement of a served population of legacy terminals; and
transmitting in a main information block (MIB) a definition for the legacy frequency band segment as comprising less than 20 MHz in response to the served population of legacy terminals having a data rate sufficiently served with a smaller allocation.

47. A computer program product for performing bandwidth segmentation in a wireless communication system, comprising:
at least one computer readable storage medium storing non-transitory computer executable instructions that, when executed by the at least one processor, implement components comprising:
a first set of instructions for causing a computer to transmit a downlink comprising a legacy frequency band segment on a single carrier;
a second set of instructions for causing the computer to transmit a contiguous advanced frequency band segment on the downlink carried by the single carrier; and
a third set of instructions for causing the computer to transmit a legacy control region on the legacy frequency band segment.

48. An apparatus for performing bandwidth segmentation in a wireless communication system, comprising:
at least one processor;
at least one computer readable storage medium storing computer executable instructions that, when executed by the at least one processor, implement components comprising:
means for transmitting a downlink comprising a legacy frequency band segment on a single carrier;
means for transmitting a contiguous advanced frequency band segment on the downlink carried by the single carrier; and
means for transmitting a legacy control region on the legacy frequency band segment.

49. An apparatus for performing bandwidth segmentation in a wireless communication system, comprising:
a scheduler for assigning resources on an uplink and a downlink;
a receiver for receiving the uplink; and
a transmitter for transmitting the downlink by,
transmitting a downlink comprising a legacy frequency band segment on a single carrier,
transmitting a contiguous advanced frequency band segment on the downlink carried by the single carrier, and
transmitting a legacy control region on the legacy frequency band segment.

50. The apparatus of claim 49, wherein the transmitter is further transmitting the downlink by,
transmitting a downlink comprising the legacy frequency band segment on the single carrier containing the legacy control region and at least one legacy data region;
transmitting the contiguous advanced frequency band segment on the downlink carried by the single carrier comprising an advanced data region; and
transmitting an advanced control region on the downlink that is exclusive of the legacy control region.

51. The apparatus of claim 50, wherein the scheduler is further for determining a first served population of legacy terminals and a second served population of advanced terminals; and
the transmitter is further for transmitting in a main information block (MIB) a definition for the legacy frequency band segment as comprising less than 20 MHz in response in response to the first served population of legacy terminals being smaller than the second served population of advanced terminals.

52. The apparatus of claim 50, wherein the transmitter is further for transmitting the advanced control region within a data time slot of the legacy frequency band segment.

53. The apparatus of claim 52, wherein the transmitter is further for frequency hopping the advanced control region across two data time slots of the legacy frequency band segment.

54. The apparatus of claim 50, wherein the transmitter is further for transmitting the advanced control region within the contiguous advanced frequency band segment.

55. The apparatus of claim 50, wherein the transmitter is further for transmitting the single carrier by transmitting a physical downlink control channel (PDCCH) wherein the legacy control region comprises a time slot within the legacy frequency band segment.

56. The apparatus of claim 50, wherein the transmitter is further for transmitting the single carrier by transmitting a physical uplink control channel (PUCCH) wherein the legacy control region is frequency division duplex (FDD) separated from data regions.

57. The apparatus of claim 50, wherein the transmitter is further for transmitting a second contiguous advanced frequency band segment separated from the contiguous advanced frequency band segment by the legacy frequency band segment, wherein the second contiguous advanced frequency band segment is contiguous with the legacy frequency band segment.

58. The apparatus of claim 50, wherein the transmitter is further for transmitting a 10 MHz first contiguous advanced frequency band segment and a 10 MHz second contiguous advanced frequency band segment separated by a 20 MHz legacy frequency band segment.

59. The apparatus of claim 50, wherein the transmitter is further for broadcasting information regarding the advanced control region in a system information broadcast.

60. The apparatus of claim 59, wherein the transmitter is further for conveying the system information broadcast by dedicated signaling to an advanced terminal.

61. The apparatus of claim 50, wherein the transmitter is further for defining a guard band between legacy band and the contiguous advanced frequency band segment.

62. The apparatus of claim 50, wherein the transmitter is further for transmitting the advanced control region as an extension to synchronization and system information transmitted by the legacy control region on the single carrier.

63. The apparatus of claim 50, wherein the transmitter is further for transmitting the advanced control region for data.

64. The apparatus of claim 50, wherein the transmitter is further for transmitting the advanced control region for control.

65. The apparatus of claim 64, wherein the transmitter is further for transmitting the advanced control region for data and control.

66. The apparatus of claim 50, wherein the scheduler is further for determining a data requirement of a served population of legacy terminals; and the transmitter is further for transmitting in a main information block (MIB) a definition for the legacy frequency band segment as comprising less than 20 MHz in response to the served population of legacy terminals having a data rate sufficiently served with a smaller allocation.

* * * * *